(12) United States Patent
Koo

(10) Patent No.: US 12,334,992 B2
(45) Date of Patent: **\*Jun. 17, 2025**

(54) REAL-TIME OPTIMIZATION OF NETWORK PARAMETERS

(71) Applicant: VIAVI Solutions Inc., Chandler, AZ (US)

(72) Inventor: Eng Wei Koo, Colorado Springs, CO (US)

(73) Assignee: VIAVI Solutions Inc., Chandler, AZ (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/449,000

(22) Filed: Aug. 14, 2023

(65) Prior Publication Data

US 2023/0396345 A1 Dec. 7, 2023

Related U.S. Application Data

(63) Continuation of application No. 17/176,991, filed on Feb. 16, 2021, now Pat. No. 11,742,963.

(51) Int. Cl.
*H04B 17/309* (2015.01)
*H04L 43/0817* (2022.01)
(Continued)

(52) U.S. Cl.
CPC ....... *H04B 17/309* (2015.01); *H04L 43/0817* (2013.01); *H04L 43/0823* (2013.01);
(Continued)

(58) Field of Classification Search
CPC .............. H04B 17/309; H04L 43/0817; H04L 43/0823; H04L 43/0876; H04W 24/08; H04W 24/10; H04W 72/046
See application file for complete search history.

(56) References Cited

U.S. PATENT DOCUMENTS 10,979,326 B2    4/2021  Koo
11,540,154 B2 \*  12/2022  Ngai ................... H04W 4/33
(Continued)

FOREIGN PATENT DOCUMENTS

EP    1366578 A1    12/2003
EP    3311595 A1    4/2018
(Continued)

OTHER PUBLICATIONS

Extended European Search Report for Application No. EP22156715.9, mailed on Jul. 15, 2022, 9 pages.

*Primary Examiner* — Habte Mered
(74) *Attorney, Agent, or Firm* — Harrity & Harrity, LLP

(57) ABSTRACT

In some implementations, a network monitoring device may obtain communication information associated with data communication between the network station and a user equipment (UE). The network monitoring device may compute a location of the UE in an environment based on the communication information. The network monitoring device may determine a measure of quality associated with a coverage provided to the UE based on the location of the UE. The network monitoring device may provide, to the network station, real-time feedback information associated with adjusting one or more network parameters when the measure of quality associated with the coverage fails to satisfy a threshold quality level.

20 Claims, 8 Drawing Sheets

(51) Int. Cl.
*H04L 43/0823* (2022.01)
*H04L 43/0876* (2022.01)
*H04W 24/08* (2009.01)
*H04W 24/10* (2009.01)
*H04W 72/044* (2023.01)

(52) U.S. Cl.
CPC ......... *H04L 43/0876* (2013.01); *H04W 24/08* (2013.01); *H04W 24/10* (2013.01); *H04W 72/046* (2013.01)

(56) References Cited

U.S. PATENT DOCUMENTS

| | | |
|---|---|---|
| 11,742,963 B2 | 8/2023 | Koo |
| 2011/0212720 A1 | 9/2011 | Hamalainen et al. |
| 2015/0098352 A1 | 4/2015 | Froehlich |
| 2016/0165472 A1 | 6/2016 | Gopalakrishnan et al. |
| 2017/0064591 A1* | 3/2017 | Padfield ............ H04W 36/0088 |
| 2018/0115958 A1 | 4/2018 | Raghavan et al. |
| 2018/0302892 A1* | 10/2018 | Ökvist et al. ... H04W 36/00837 |
| 2018/0316412 A1* | 11/2018 | Senior ................... H04W 52/38 |
| 2021/0195674 A1* | 6/2021 | Park ...................... H04W 76/18 |
| 2021/0377788 A1 | 12/2021 | Yoon |
| 2022/0014936 A1 | 1/2022 | Shi et al. |
| 2022/0070701 A1* | 3/2022 | Bedekar ................ H04W 24/08 |
| 2022/0224494 A1* | 7/2022 | Taherzadeh Boroujeni ................ H04B 17/24 |

FOREIGN PATENT DOCUMENTS

| | | |
|---|---|---|
| EP | 3709529 A1 | 9/2020 |
| WO | 0028755 A1 | 5/2000 |
| WO | 02063796 A1 | 8/2002 |
| WO | 2010051838 A1 | 5/2010 |
| WO | 2016206713 A1 | 12/2016 |
| WO | 2019224649 A1 | 11/2019 |
| WO | WO-2019217723 A1 * | 11/2019 ............. H04L 43/06 |
| WO | 2020167236 A1 | 8/2020 |
| WO | 2020214168 A1 | 10/2020 |
| WO | 2021144607 A1 | 7/2021 |
| WO | 2022029197 A1 | 2/2022 |

\* cited by examiner

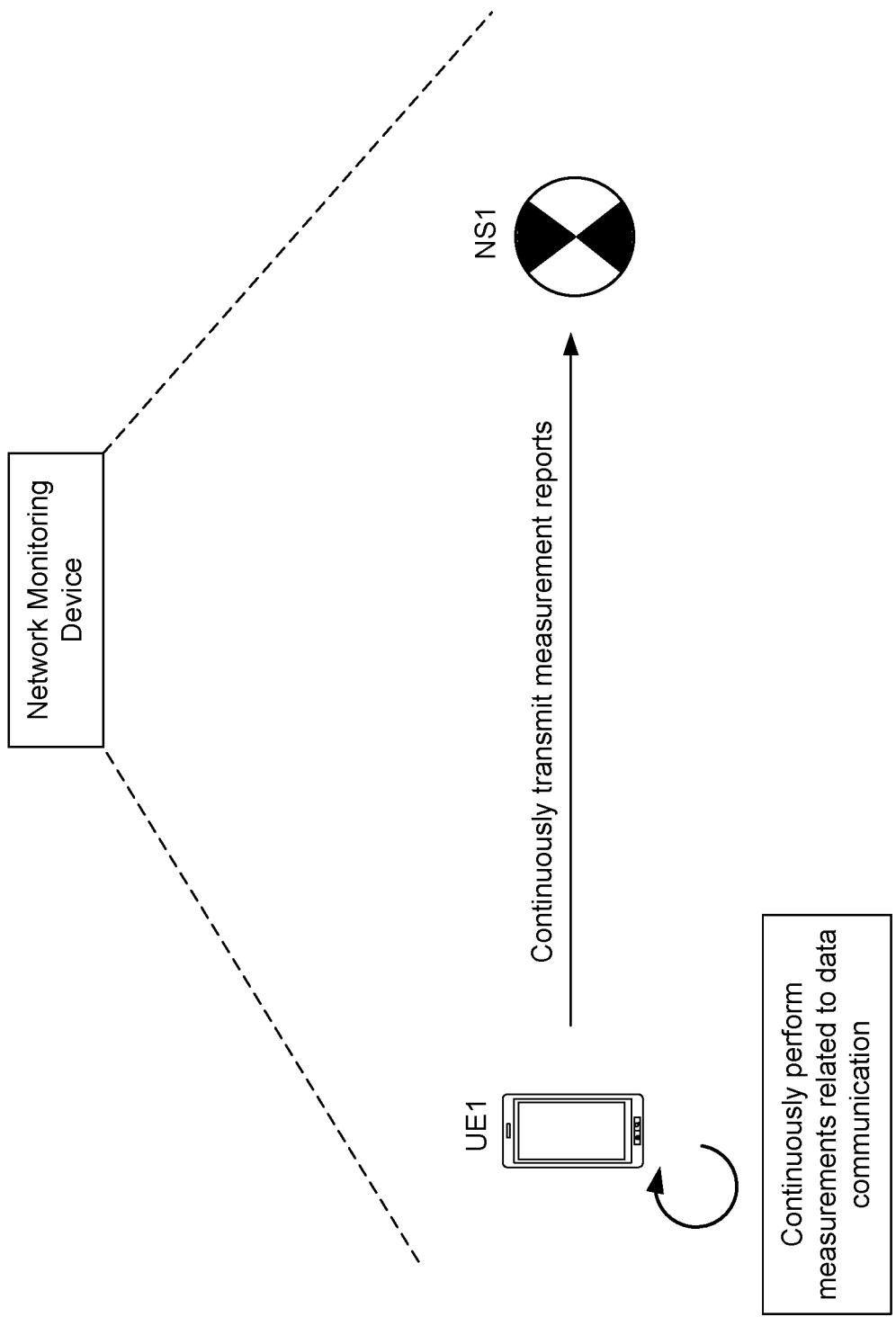

REAL-TIME OPTIMIZATION OF NETWORK PARAMETERS

RELATED APPLICATION

This application is a continuation of U.S. patent application Ser. No. 17/176,991, filed Feb. 16, 2021, which is incorporated herein by reference in its entirety.

BACKGROUND

To provide adequate network coverage in an environment, a plurality of network stations may be deployed at strategic locations within the environment. The plurality of network stations may transmit a plurality of beams to reach the different areas within the environment to provide the adequate coverage.

SUMMARY

In some implementations, a method includes obtaining communication information associated with data communication between the network station and a user equipment (UE); computing a location of the UE in an environment based on the communication information; determining a measure of quality associated with a coverage provided to the UE based on the location of the UE; and providing, to the network station, real-time feedback information associated with adjusting one or more network parameters when the measure of quality associated with the coverage fails to satisfy a threshold quality level.

In some implementations, a device includes one or more processors configured to: obtain communication information associated with data communication between the network station and a UE; compute a location of the UE in an environment based on the communication information; determine a measure of quality associated with a coverage provided to the UE based on the location of the UE; and provide, to the network station, real-time feedback information associated with adjusting one or more network parameters when the measure of quality associated with the coverage fails to satisfy a threshold quality level.

In some implementations, a non-transitory computer-readable medium storing a set of instructions includes one or more instructions that, when executed by one or more processors of a device, cause the device to: obtain communication information associated with data communication between the network station and a UE; compute a location of the UE in an environment based on the communication information; determine a measure of quality associated with a coverage provided to the UE based on the location of the UE; and provide, to the network station, real-time feedback information associated with adjusting one or more network parameters when the measure of quality associated with the coverage fails to satisfy a threshold quality level.

BRIEF DESCRIPTION OF THE DRAWINGS

FIGS. 1A-1E are diagrams of an example implementation described herein.

DETAILED DESCRIPTION

Figure 1A:
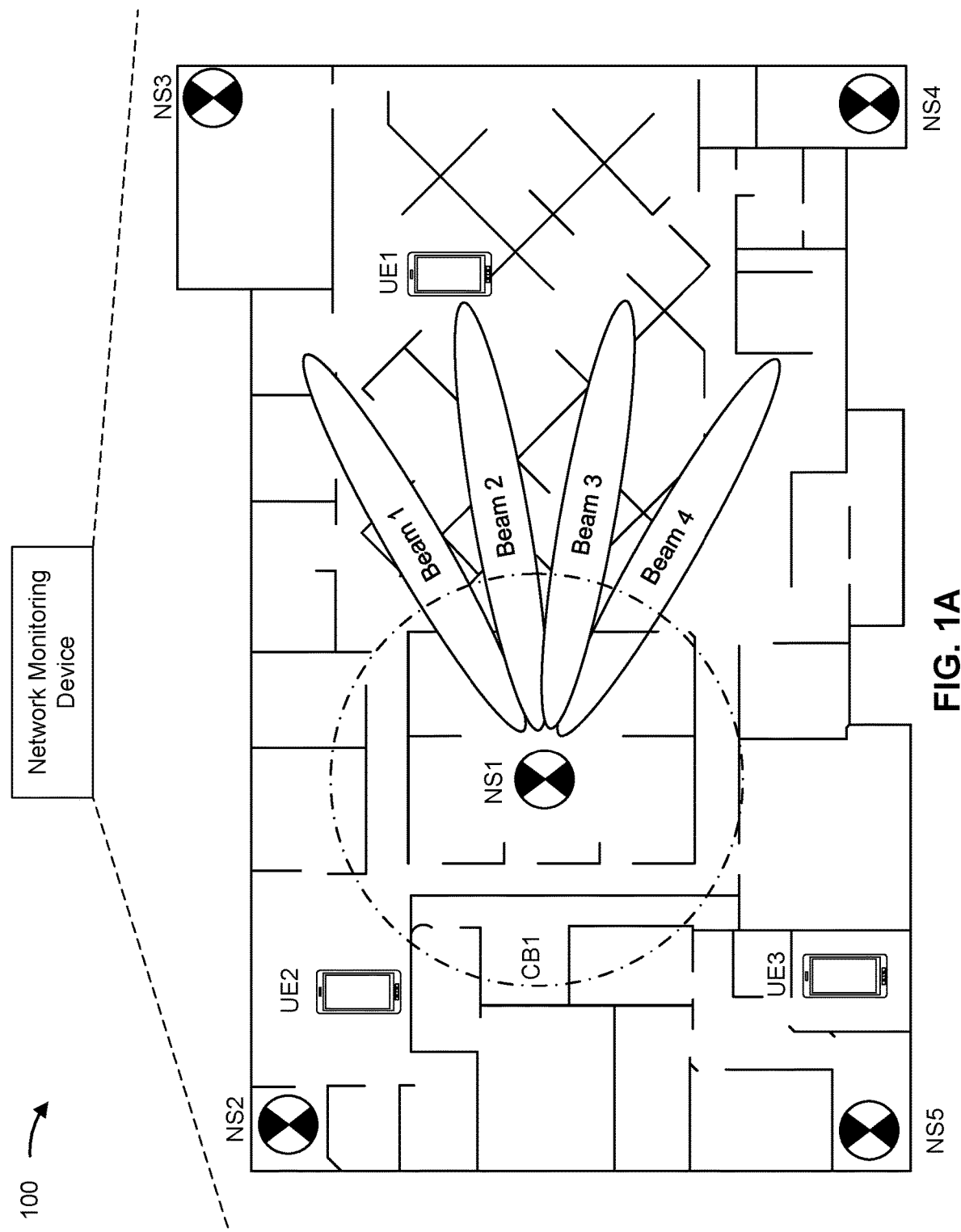

The following detailed description of example implementations refers to the accompanying drawings. The same reference numbers in different drawings may identify the same or similar elements.

A service provider may want to provide adequate network coverage within an environment. To provide the adequate network coverage, the service provider may deploy a plurality of network stations at strategic locations within the environment. The plurality of network stations may transmit respective beams to provide network coverage to different areas within the environment.

During operation, however, providing the adequate network coverage may be difficult due to changes in the environment. For instance, after the network stations have been deployed, the beams utilized to provide the network coverage may be temporarily blocked due to transient obstructions (e.g., people, banners, moving obstacles, or the like) or may be persistently blocked due to subsequent placement of non-transient obstructions (e.g., walls, equipment, or the like). Because such changes may not be accounted for prior to deployment of the network stations, the network coverage provided by the deployed network stations may be inadequate. Accounting for the changes after deployment of the network stations may involve conducting multiple walk tests, which are unreliable and expensive because the walk tests involve a person walking or driving with a radio frequency scanner and test equipment to cover different areas of the environment.

Due to the beams being blocked, a measure of quality of the coverage may fail to satisfy a threshold quality level (e.g., the measure of quality of the coverage is lower than the threshold quality level). As a result, data communication between the plurality of network stations and user equipments (UEs) in the environment may experience an interruption or a stoppage.

Some implementations discussed herein enable real-time optimization (e.g., adjusting) of network parameters, thereby enabling provision of adequate network coverage during operation (e.g., after deployment of network stations). For instance, a network monitoring device may continuously monitor data communication between network stations and UEs. In some implementations, the network monitoring device my continuously receive and analyze communication information to detect transient blockages and/or non-transient blockages affecting the data communication over the beams. When a transient blockage or a non-transient blockage is detected, the network monitoring device may determine and provide real-time feedback information to the network stations to address the detected blockage. The feedback information may enable the network stations to instantly adjust one or more network parameters to reduce effects of the detected blockage. As a result, the network monitoring device may enable the network stations to improve a measure of quality associated with the network coverage and avoid instances in which data communication between the network station and the UE may experience an interruption or a stoppage. Additionally, by determining the feedback information, the network monitoring device may conserve network station resources (e.g., management resources, processing resources, network bandwidth, or the like) and UE resources (e.g., amount of processing, utilization of memory, power consumption, or the like) that would have otherwise been consumed as a result of the transient blockages and/or non-transient blockages.

FIGS. 1A-1E are diagrams of an example implementation 100 described herein. Implementation 100 may comprise a network including a plurality of network stations (shown as NS1 through NS5), a plurality of UEs (shown as UE1 through UE3), and a network monitoring device communicating with each other. The network stations and the UEs may conduct data communication including downlink communications from the network stations to the UEs and uplink communications from the UEs to the network stations. The network monitoring device may monitor the network and the data communication between the network stations and the UEs.

The implementation 100 may be implemented in an outdoor environment. Alternatively, as shown in FIG. 1A the implementation 100 may be implemented in an indoor environment. For instance, the plurality of network stations may be strategically deployed to provide network coverage within the indoor environment. To provide the network coverage, each of the plurality of network stations may transmit respective coverage beams (shown as CB1 transmitted by NS1) and/or dedicated beams (shown as Beam 1, Beam 2, Beam 3, Beam 4 transmitted by NS1).

In some implementations, a network station (e.g., NS1) may be configured to transmit a coverage beam (e.g., CB1) to cover a particular cell area around the network station (e.g., to a location which can be horizontal in space and/or vertical in space). Each cell area may have a cell identifier (e.g., cell ID). The coverage beam may be associated with a particular radius, a beam width (e.g., in degrees), and/or the like. For example, a coverage beam may have a beam width of one degree and may be transmitted to a point 20 meters from the network station, resulting in a radius of 0.17 meters. The network station may also transmit one or more dedicated beams (e.g., Beam 1 through Beam 4) to provide dedicated network coverage in particular directions. In some implementations, the dedicated beams may be formed using beamforming techniques.

The implementations described herein apply to both coverage beams and dedicated beams. For example, a UE may be connected to a coverage beam transmitted by a given network station, may be connected to a dedicated beam transmitted by the given network station, may receive one or more dedicated beams transmitted by the given network station, may receive one or more coverage beams transmitted by a different network station, may receive one or more dedicated beams transmitted by a different network station, and/or the like. A beam (e.g., coverage beam and/or a dedicated beam) to which a UE is connected for communicating with the given network station may be referred to as a connected beam. A beam (e.g., coverage beam and/or a dedicated beam) that a UE receives from the given network station and/or a different network station may be referred to as a surrounding beam.

UE1 may be located within the cell area covered by NS1. The cell ID for the cell area covered by NS1 may be Cell-1. In this case, UE1 may be connected to the coverage beam CB1 and/or to dedicated Beam 2 transmitted by NS1. Also, UE1 may receive one or more surrounding beams including Beam 1, Beam 3, and Beam 4 transmitted by NS1. UE1 may also receive surrounding beams including a coverage beam and one or more dedicated beams transmitted by, for example, NS3. Similarly, UE2 may be located within the cell area covered by NS2 and may be connected to a coverage beam and/or a dedicated beam transmitted by NS2. Also, UE2 may receive one or more surrounding beams including one or more dedicated beams transmitted by NS2 and a coverage beam and one or more dedicated beams transmitted by, for example, NS1. UE3 may be located within the cell area covered by NS5 and may be connected to a coverage beam and/or a dedicated beam transmitted by NS5. Also, UE3 may receive one or more surrounding beams including one or more dedicated beams transmitted by NS5 and a coverage beam and one or more dedicated beams transmitted by, for example, NS1.

As shown in FIG. 1B, during operation, UE1 may continuously perform various measurements related to the data communication between UE1 and NS1. The various measurements may include measurements of a respective reference signal received power (RSRP) value, a respective reference signal received quality (RSRQ) value, a respective signal-to-interference-plus-noise ratio (SINR) value, and/or the like. The RSRP value may be associated with an average power of a reference signal received by UE1. The RSRQ value may be associated with a quality of a network signal received by UE1. The SINR value may be associated with an amount of interference observed in a received signal and may indicate a quality associated with the received signal. The RSRP, RSRQ, and/or SINR measurements may be with respect to connected Beam 2 utilized by UE1 to communicate with NS1 and/or with respect to a surrounding beam being received by UE1.

UE1 may also measure a data throughput value associated with the data communication, a latency value associated with the data communication, and/or a packet loss value associated with the data communication. The data throughput value may be associated with throughput related to uplink communications and/or with downlink communications. The latency value may be associated with a delay (e.g., average delay, distribution of delay, or the like) related to transmission and/or reception of data by UE1. The packet loss value may be associated with a failure of data transmitted by UE1 being received by NS1 and vice versa. In some implementations, the performance of the various measurements may be with respect to the connected beam utilized by UE1 to communicate with NS1. For example, UE1 may perform the various measurements with respect to Beam 2.

In some implementations, UE1 may perform sets of various measurements periodically (e.g., every 60 seconds, 120 seconds, or the like). In some implementations, UE1 may perform the sets of various measurements based on a change of location of UE1, according to a schedule, based on a request from a network station, based on being handed over from one beam/cell to another beam/cell, based on detecting a threshold amount of power associated with a beam, based on an event (e.g., event-triggered), periodically based on an event (e.g., event-triggered periodic), and/or the like.

As also shown in FIG. 1B, UE1 may continuously transmit to NS1 one or more measurement reports including the various measurements. In some implementations, UE1 may transmit the one or more measurement reports upon performing a set of measurements. In some implementations, the one or more measurement reports may be transmitted via a radio resource control (RRC) transfer (e.g., an NR measurement report in an RRC container), an uplink (UL) RRC message transfer (e.g., in an RRC container), and/or the like. In some aspects, the UE1 may continuously transmit the measurement reports to the network monitoring device.

Figure 1C:
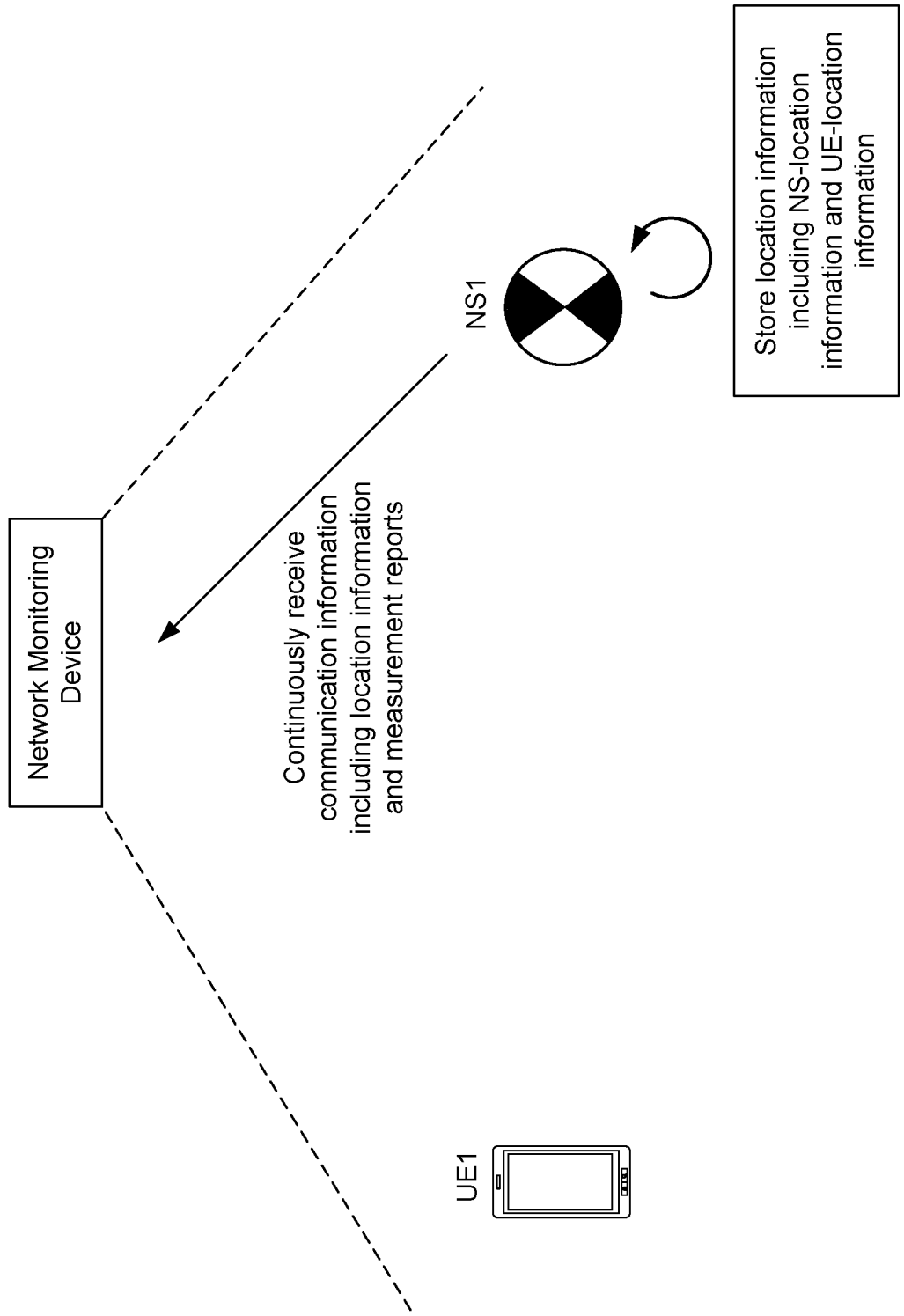

As shown in FIG. 1C, NS1 may store NS-location information that identifies a location of NS1 within the indoor environment. Such NS-location information may include, for example, global positioning system (GPS) coordinates of NS1, beam IDs of beams transmitted by NS1, a cell ID associated with the cell area covered by NS1, or the like. NS1 may also store UE-location information that identifies locations of UEs (e.g., UE1) conducting data communication with NS1. Such UE-location information may include identification information (e.g., International Mobile Equipment Identity (IMEI)), information of a direction and/or phase (e.g., direction/phase) of transmission on a beam (e.g., Beam 2) connected to the UE, a transmission gain associated with transmitting a beam connected to the UE, a distance of the UE with respect to NS1, and/or the like.

As also shown in FIG. 1C, the network monitoring device may communicate with NS1 to continuously receive (e.g., obtain) communication information associated with the data communication between NS1 and UE1. In some aspects, the network monitoring device may communicate with UE1 to continuously receive (e.g., obtain) communication information associated with the data communication between NS1 and UE1. The communication information may include the location information and/or the one or more measurement reports.

Figure 1D:
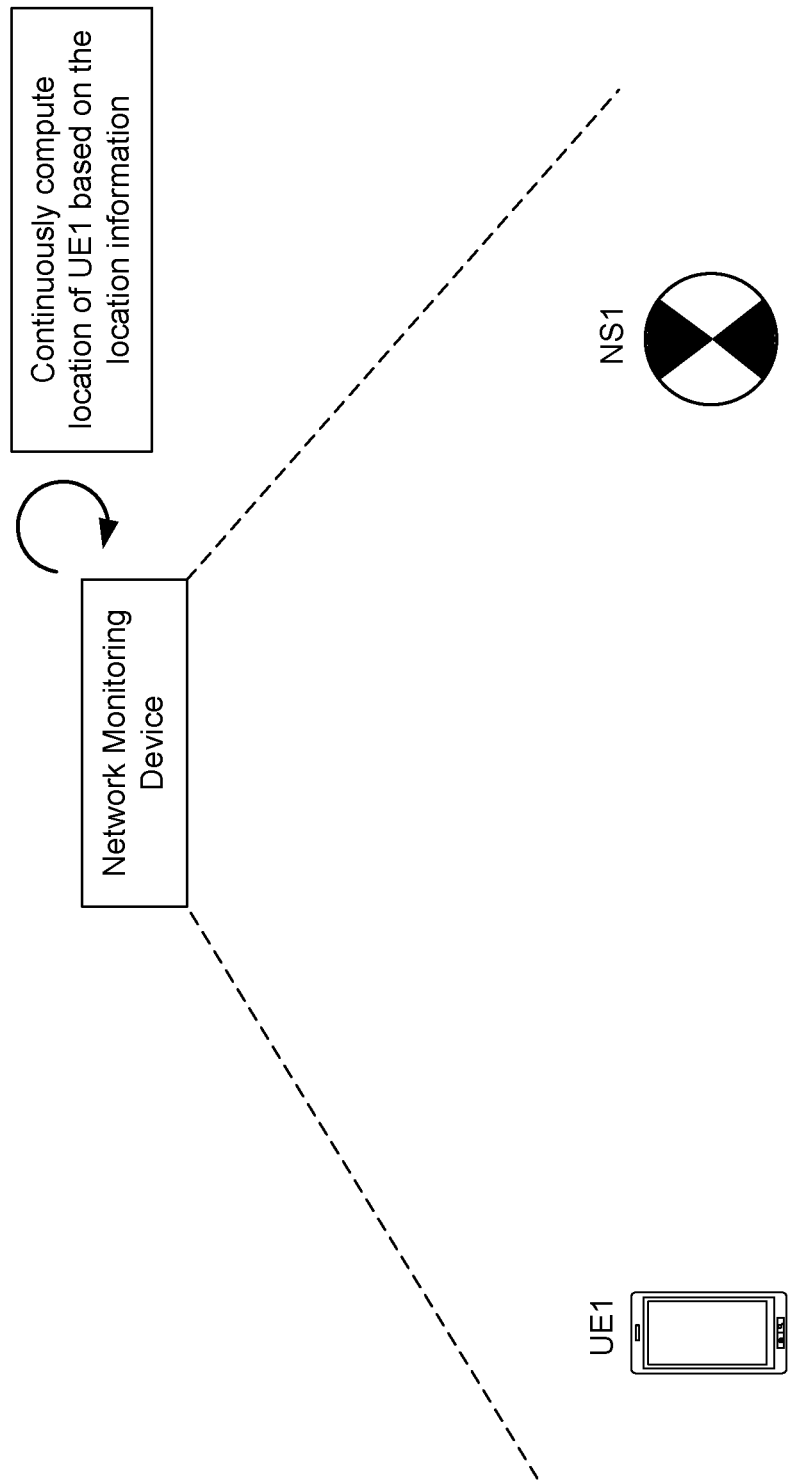

With respect to the location information, the network monitoring device may receive NS-location information and the UE-location information. Based on the location information, as shown in FIG. 1D, the network monitoring device may continuously compute a location of UE1 within the indoor environment. In some implementations, the network monitoring device may compute that UE1 is located within the cell area covered by NS1, that UE1 is connected to Beam 2, that UE1 is located at a given distance in a given direction from NS1, and/or that UE1 is receiving surrounding beams Beam 1, Beam 3, Beam 4, and other dedicated beams transmitted by other surrounding network stations. Based on the computed location of UE1, the network monitoring device may continuously analyze information in relevant measurement reports to continuously determine a measure of quality associated with the network coverage provided to UE1. For instance, with respect to UE1, the network monitoring device may analyze measurement reports associated with connected Beam 2 and the surrounding beams associated with UE1. In other words, the network monitoring device may analyze the measured RSRP, RSRQ, SINR, data throughput, latency, and/or packet loss values associated with the data communication between UE1 and NS1 over connected Beam 2 and the surrounding beams.

Figure 1E:
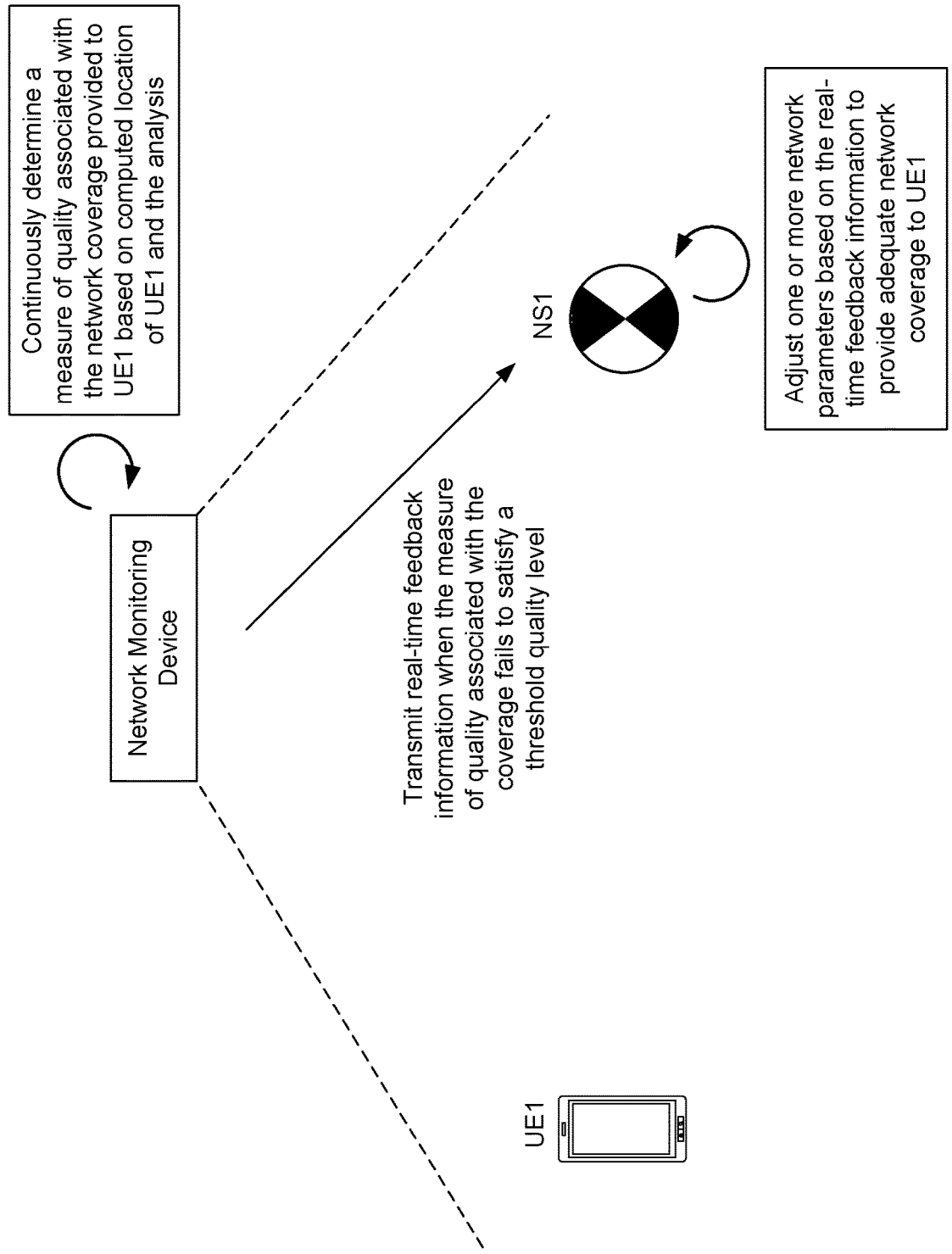

For instance, as shown in FIG. 1E, the network monitoring device may continuously determine a measure of quality associated with a coverage provided to UE1 based on the analysis of the measurement reports and the computed location of UE1. In an example, the network monitoring device may compare one or more of the received measurements with respective threshold quality levels to determine whether the network coverage being provided to UE1 is adequate. In some implementations, the network monitoring device may determine that the network coverage being provided to UE1 is adequate when a measured value satisfies a respective threshold quality level (e.g., the measured value is equal to or greater than the respective threshold quality level). Similarly, the network monitoring device may determine that the network coverage being provided to UE1 is inadequate when the measured value fails to satisfy the respective threshold quality level (e.g., the measured value is less than the respective threshold quality level).

In one example, the network monitoring device may determine that the network coverage being provided to UE1 is adequate when a measured RSRP value satisfies a respective threshold RSRP quality level (e.g., the measured RSRP value is equal to or greater than the respective threshold RSRP quality level). Similarly, the network monitoring device may determine that the network coverage being provided to UE1 is inadequate when the measured RSRP value fails to satisfy the respective threshold RSRP quality level (e.g., the measured RSRP value is less than the respective threshold RSRP quality level). In another example, the network monitoring device may determine that the network coverage being provided to UE1 is adequate when a measured latency value satisfies a respective threshold latency quality level (e.g., the measured latency value is equal to or greater than the respective threshold latency quality level). Similarly, the network monitoring device may determine that the network coverage being provided to UE1 is inadequate when the measured latency value fails to satisfy the respective threshold latency quality level (e.g., the measured latency value is less than the respective threshold latency quality level).

In some implementations, the network monitoring device may determine that the network coverage being provided to UE1 is inadequate (e.g., a measure of quality associated with the coverage fails to satisfy a threshold quality level) when the network monitoring device estimates that connected Beam 2 may be experiencing a transient blockage or a non-transient blockage. In other words, the network monitoring device may determine that the network coverage being provided to UE1, in a currently computed location of UE1, is inadequate due to a transient blockage or a non-transient blockage obstructing the coverage provided by connected Beam 2. The transient blockage and/or non-transient blockage may prevent network signals from reaching UE1 by, for example, blocking the network signals. In some cases, the transient blockage and/or non-transient blockage may prevent network signals from reaching UE1 by, for example, refracting or reflecting the network signals away from UE1.

In some implementations, the network monitoring device may determine that connected Beam 2 is experiencing a transient blockage based on the blockage lasting for less than a threshold amount of time and may determine that the connected Beam 2 is experiencing a non-transient blockage based on the blockage lasting for greater than the threshold amount of time. In some implementations, the network monitoring device may determine that connected Beam 2 is experiencing a transient blockage based on the blockage being detected on fewer than a threshold number of successive measurement reports and may determine that the connected Beam 2 is experiencing a non-transient blockage based on the blockage being detected on a number of successive measurement reports equal to or greater than the threshold number.

Based on determining that the network coverage being provided to UE1 is inadequate, as also shown in FIG. 1E, the network monitoring device may provide real-time feedback information to NS1 to adjust one or more network parameters, thereby enabling NS1 to provide adequate coverage to UE1. In some implementations, the one or more network parameters may include a transmission gain associated with transmission on connected Beam 2, a direction/phase of transmission on connected Beam 2, a number of dedicated beams transmitted by NS1, a number of antennas included in NS1 for transmitting the beams, or the like.

In some implementations, the real-time feedback information may be based on estimating whether the obstruction is a transient blockage or a non-transient blockage. When the network monitoring device estimates that the obstruction is a transient blockage, the real-time feedback information may include information informing NS1 that the transient blockage may be overcome and adequate network coverage may be provided to UE1 by increasing a transmission gain associated with transmission on connected Beam 2 and/or changing a direction/phase of transmission on connected Beam 2. Based on a difference between the measured value (e.g., measured RSRP value) and the respective threshold quality level (e.g., threshold RSRP quality level), the network monitoring device may determine an amount of increase in the transmission gain associated with transmission on connected Beam 2 to provide adequate coverage to UE1. Similarly, based on a difference between the measured value (e.g., measured RSRP value) and the respective threshold quality level (e.g., threshold RSRP quality level), the network monitoring device may determine an amount of change in the direction/phase of transmission on connected Beam 2 to provide adequate coverage to UE1.

For instance, when the difference between the measured value and the respective threshold quality level is equal to or greater than a given difference value, the network monitoring device may determine that the transmission gain associated with transmission on connected Beam 2 is to be increased by a first gain amount and/or the direction/phase of transmission associated with connected Beam 2 is to be changed by a first direction/phase amount. Similarly, when the difference between the measured value and the respective threshold quality level is less than the given difference value, the network monitoring device may determine that the transmission gain associated with transmission on connected Beam 2 is to be increased by a second gain amount and/or the direction/phrase of transmission associated with connected Beam 2 is to be changed by a second direction/phase amount. The first gain amount may be larger than the second gain amount and the first direction/phase amount may be larger than the second direction/phase amount.

When the network monitoring device determines that the obstruction is a non-transient blockage, the real-time feedback information may include information informing NS1 that the non-transient blockage may be overcome and adequate network coverage may be provided to UE1 by processing a handover of UE1 to a surrounding beam (e.g., enabling UE1 to connect to a surrounding beam). For instance, based on analyzing measurement reports associated with connected Beam 2 and the surrounding beams, the network monitoring device may determine that UE1 may be provided adequate network coverage via, for example, Beam 1 transmitted by NS1 or via another beam (e.g., coverage and/or dedicated beam) transmitted by, for example, NS3. Additionally, or alternatively, the real-time feedback information may include information informing NS1 to transmit using an additional number of antennas and/or dedicated beams having a certain gain and direction/phase that would provide adequate coverage to UE1 (and other UEs) in the computed location.

In some implementations, the network monitoring device may continuously receive the communication information from NS1 and/or UE1 and continuously analyze the received communication information, thereby enabling the network monitoring device to provide the real-time feedback to NS1. For instance, the network monitoring device may receive the communication information every time UE1 performs the various measurements and transmits a measurement report to NS1 or to the network device, every time a location of UE1 changes, or the like. Additionally, the network monitoring device may receive the communication information periodically (e.g., every 60 seconds, every 120 seconds, or the like). The network monitoring device may continuously analyze the received communication information upon receipt of the communication information to estimate whether the measure of quality associated with the network coverage satisfies the threshold quality level, as discussed above. Based on the real-time feedback information, NS1 may adjust the one or more network parameters and provide adequate network coverage to UE1.

Further, to validate the adjustments to the one or more network parameters and to confirm that adequate network coverage is being provided to UE1, the network monitoring device may receive and analyze communication information after adjusting of the one or more network parameters by NS1. In a situation where the network monitoring device determines that adequate network coverage is not being provided to UE1 after adjusting the one or more network parameters, the network monitoring device may provide updated real-time feedback information to NS1 to further adjust the one or more network parameters such that adequate network coverage may be provided to UE1. The network monitoring device may continuously provide updated real-time feedback information to NS1 to continuously adjust the one or more network parameters until adequate network coverage is provided to UE1. In this way, the network monitoring device may continuously estimate whether the measure of quality associated with the network coverage satisfies the threshold quality level, and continuously provide real-time feedback information to adjust one or more network parameters when the measure of quality fails to satisfy the threshold quality level.

Although the above description regarding real-time optimization of network parameters describes operation of the network monitoring device with respect to NS1 and UE1, the present disclosure contemplates analogous operation of the network monitoring device with respect to any other network station (e.g., NS2, NS3, NS4, NS5) and/or UE (e.g., UE2, UE3).

By utilizing techniques for real-time optimization of network parameters, as discussed herein, a network station may be enabled to adjust one or more network parameters in real time to provide adequate network coverage to a UE, for example, when network coverage to the UE experiences a transient blockage and/or a non-transient blockage. As a result, even after deployment of the network stations in the environment, instances in which data communication between a network station and a UE experiences an interruption or a stoppage may be avoided. Additionally, UE resources (e.g., processing resources, memory space, power consumption, or the like) and network station resources (e.g., management resources, processing resources, or the like) that would otherwise have to be utilized in connection with addressing an interruption or a stoppage in the data communication may be utilized for other tasks, thereby enabling efficient utilization of the UE resources and the network resources.

Figure 2:
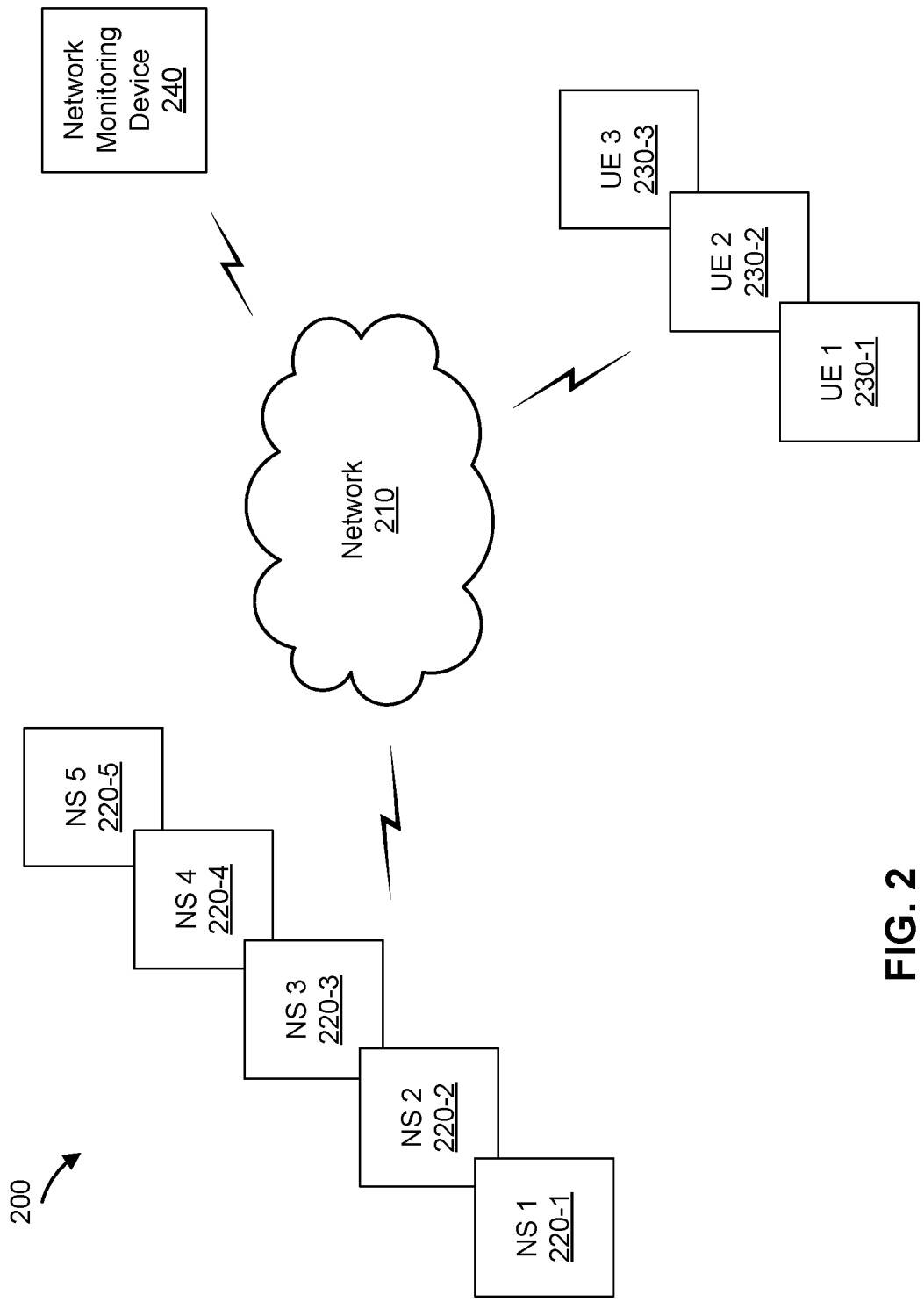
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may comprise devices including a plurality of network stations (shown as NS1 220-1 through NS5 220-5 and collectively referred to as network stations 220), a plurality of UEs (shown as UE1 230-1 through UE3 230-3 and collectively referred to as UEs 230), and a network monitoring device 240 communicating with each other via a network 210. A network station may be, for example, a base station, a network access point, or the like suitable for deployment in an indoor environment or an outdoor environment.

In some implementations, the network stations 220 and the UEs 230 may conduct data communication including downlink communications from the network stations 220 to the UEs 230 and uplink communications from the UEs 230 to the network stations 220. The network monitoring device 240 may communicate with the network stations 220 and/or with the UEs 230 to receive communication information associated with the data communication between the network stations 220 and the UEs 230, as discussed above with respect to FIGS. 1A-1E. Based on receiving the communication information, the network monitoring device 240 may transmit feedback information to the network stations 220 and/or to the UEs 230 to enable real-time optimization of network parameters, as discussed above with respect to FIGS. 1A-1E.

Devices in environment 200 may interconnect via wired connections, wireless connections, or a combination of wired and wireless connections. For instance, the network 210 may include one or more wired and/or wireless networks such as a cellular network (e.g., a long-term evolution (LTE) network, a code division multiple access (CDMA) network, a 3G network, a 5G/NR network, a 6G network, millimeter wave, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and network shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
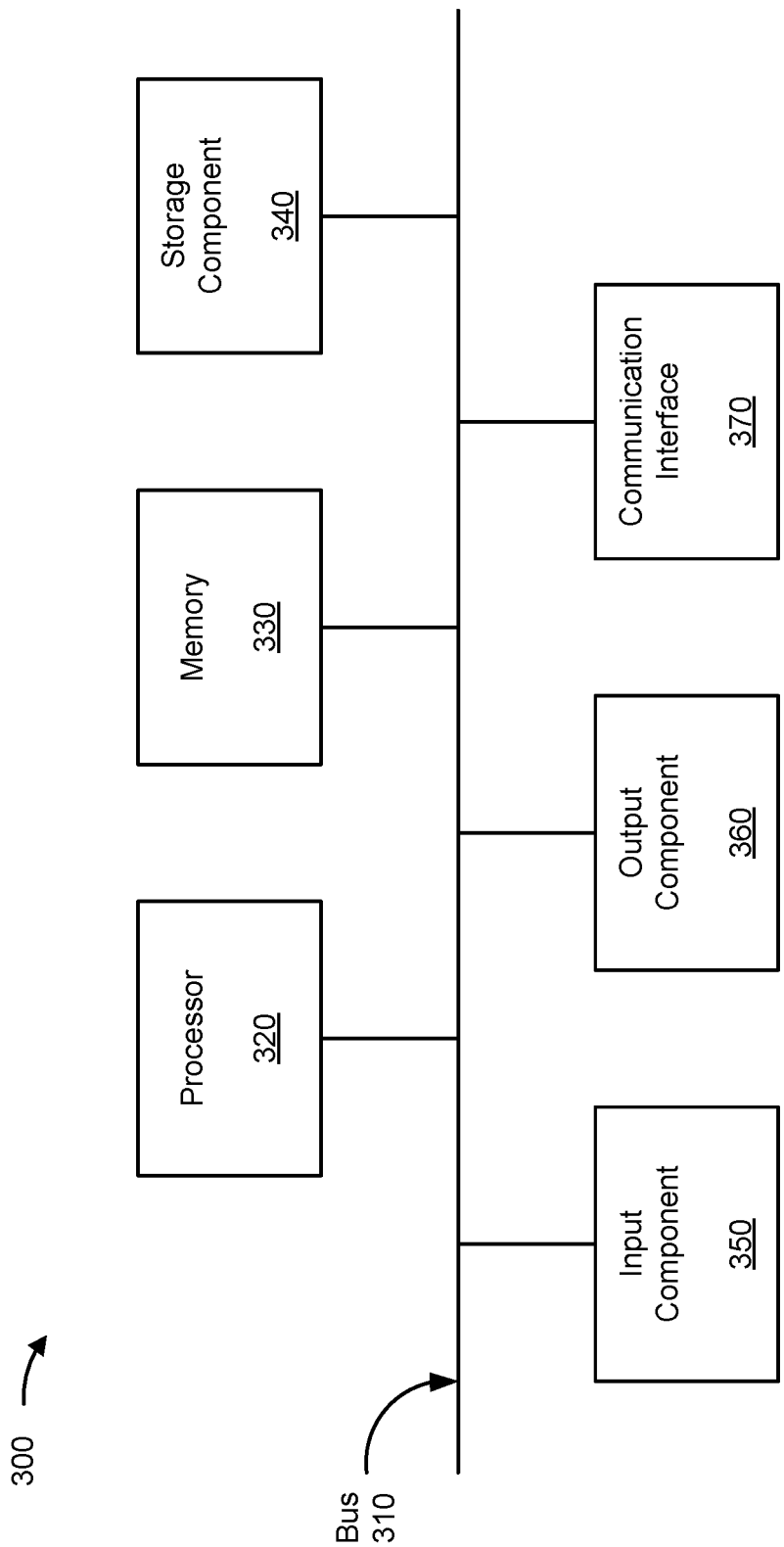
FIG. 3 a diagram of example components of one or more devices of FIG. 2.

FIG. 3 is a diagram of example components of a device 300. Device 300 may correspond to a UE (e.g., UE1, UE2, UE3), to a network station (e.g., NS1, NS2, NS3, NS4, NS5), and/or to a network monitoring device. In some implementations, the UE (e.g., UE1, UE2, UE3), the network station (e.g., NS1, NS2, NS3, NS4, NS5), and/or the network monitoring device may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
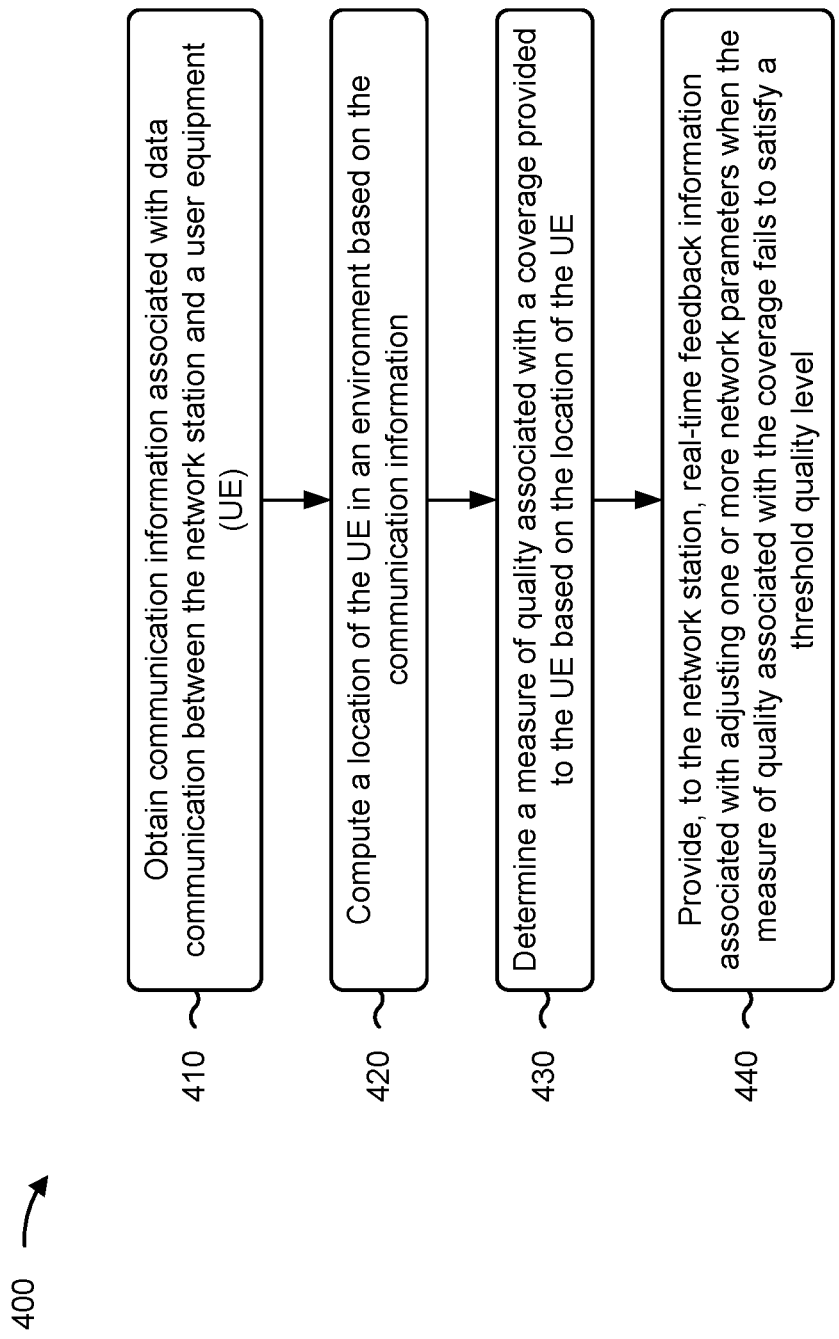
FIG. 4 is a flowchart of an example process associated with real-time optimization of network parameters.

FIG. 4 is a flowchart of an example process 400 associated with real-time optimization of network parameters. In some implementations, one or more process blocks of FIG. 4 may be performed by a network monitoring device (e.g., network monitoring device shown in FIGS. 1A-1E). In some implementations, one or more process blocks of FIG. 4 may be performed by another device or a group of devices separate from or including the network monitoring device, such as a network station (e.g., NS1, NS2, NS3, NS4, NS5 shown in FIGS. 1A-1E and 2). Additionally, or alternatively, one or more process blocks of FIG. 4 may be performed by one or more components of device 300, such as processor 320, memory 330, storage component 340, input component 350, output component 360, and/or communication interface 370.

As shown in FIG. 4, process 400 may include obtaining communication information associated with data communication between the network station and a UE (block 410). For example, the network monitoring device may obtain communication information associated with data communication between the network station and a UE, as described above.

As further shown in FIG. 4, process 400 may include computing a location of the UE in an environment based on the communication information (block 420). For example, the network monitoring device may compute a location of the UE in an environment based on the communication information, as described above.

As further shown in FIG. 4, process 400 may include determining a measure of quality associated with a coverage provided to the UE based on the location of the UE (block 430). For example, the network monitoring device may determine a measure of quality associated with a coverage provided to the UE based on the location of the UE, as described above.

As further shown in FIG. 4, process 400 may include providing (e.g., transmitting), to the network station, real-time feedback information associated with adjusting one or more network parameters when the measure of quality associated with the coverage fails to satisfy a threshold quality level (block 440). For example, the network monitoring device may provide, to the network station, real-time feedback information associated with adjusting one or more network parameters when the measure of quality associated with the coverage fails to satisfy a threshold quality level, as described above.

Process 400 may include additional implementations, such as any single implementation or any combination of implementations described below and/or in connection with one or more other processes described elsewhere herein.

In a first implementation, the communication information comprises beam identification information associated with a beam used to provide the coverage to the UE.

In a second implementation, alone or in combination with the first implementation, the communication information comprises a measure of a reference signal received power, a measure of a reference signal received quality, or a measure of a signal-to-interference-plus-noise ratio.

In a third implementation, alone or in combination with one or more of the first and second implementations, the communication information comprises a measure of a throughput associated with the data communication, a measure of latency associated with the data communication, or a measure of a packet loss associated with the data communication.

In a fourth implementation, alone or in combination with one or more of the first through third implementations, process 400 includes determining that the measure of quality associated with the coverage fails to satisfy the threshold quality level when the measure of quality associated with the coverage is less than the threshold quality level.

In a fifth implementation, alone or in combination with one or more of the first through fourth implementations, the one or more network parameters are associated with a direction of a beam or a gain of a beam used to provide the coverage to the UE.

In a sixth implementation, alone or in combination with one or more of the first through fifth implementations, providing the real-time feedback information comprises providing updated real-time feedback information associated with continuously adjusting the one or more network parameters.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a network monitoring device, that a network coverage being provided to a user equipment (UE), while the UE is in a location within an indoor environment, is inadequate due to a transient blockage or a non-transient blockage obstructing coverage provided by a connected beam; and
   providing, by the network monitoring device and to a network station based on whether the transient blockage or the non-transient blockage is obstructing the coverage provided by the connected beam, feedback information that informs the network station to adjust one or more network parameters.

2. The method of claim 1, wherein determining that the network coverage being provided to the UE is inadequate due to the transient blockage or the non-transient blockage obstructing the coverage provided by the connected beam comprises:
   determining that the connected beam is experiencing the transient blockage based on one or more of:
      a blockage lasting for less than a threshold amount of time, or
      the blockage being detected on fewer than a threshold number of successive measurement reports.

3. The method of claim 1, wherein the one or more network parameters include one or more of:
   a transmission gain associated with transmission on the connected beam,
   a direction of transmission on the connected beam,
   a number of dedicated beams transmitted by the network station, or
   a number of antennas included in the network station for transmitting beams.

4. The method of claim 1, wherein the network station is one of a plurality of network stations deployed to provide the network coverage within the indoor environment.

5. The method of claim 1, further comprising:
   determining, when the network coverage is inadequate due to the transient blockage, an amount of increase in a transmission gain associated with transmission on the connected beam for the network coverage to be adequate,
      wherein the feedback information includes information regarding the amount of increase in the transmission gain.

6. The method of claim 5, wherein determining the amount of increase in the transmission gain comprises:
   determining the amount of increase in the transmission gain based on a difference between a measured reference signal received power (RSRP) value and a threshold RSRP quality level.

7. The method of claim 5, wherein determining the amount of increase in the transmission gain comprises:
   determining a difference between a measured reference signal received power (RSRP) value and a threshold RSRP quality level; and
   determining that the amount of increase in the transmission gain is a first gain amount or a second gain amount based on whether the difference is equal to or greater than a given difference value.

8. The method of claim 1, further comprising:
   analyzing communication information after the one or more network parameters are adjusted by the network station;
   determining, based on analyzing the communication information, that the network coverage being provided to the UE is inadequate after the one or more network parameters are adjusted; and
   providing updated real-time feedback information to the network station based on determining that the network coverage being provided to the UE is inadequate.

9. A network monitoring device, comprising:
   one or more memories; and
   one or more processors, coupled to the one or more memories, configured to:
      determine that a network coverage being provided to a user equipment (UE), while the UE is in a location within an indoor environment, is inadequate due to a transient blockage or a non-transient blockage; and
      provide, to a network station and based on whether the transient blockage or the non-transient blockage is obstructing coverage provided by a connected beam, feedback information that informs the network station to adjust one or more network parameters.

10. The network monitoring device of claim 9, wherein the one or more processors, to determine that the network coverage being provided to the UE is inadequate due to the transient blockage or the non-transient blockage, are configured to:
    determine that the connected beam is experiencing the transient blockage based on one or more of:
       a blockage lasting for less than a threshold amount of time, or
       the blockage being detected on fewer than a threshold number of successive measurement reports.

11. The network monitoring device of claim 9, wherein the one or more network parameters include one or more of:
    a transmission gain associated with transmission on the connected beam,
    a direction of transmission on the connected beam,
    a number of dedicated beams transmitted by the network station, or
    a number of antennas included in the network station for transmitting beams.

12. The network monitoring device of claim 9, wherein the network station is one of a plurality of network stations deployed to provide the network coverage within the indoor environment.

13. The network monitoring device of claim 9, wherein the one or more processors are further configured to:
    determine, when the network coverage is inadequate due to the transient blockage, an amount of increase in a transmission gain associated with transmission on the connected beam for the network coverage to be adequate, and
       wherein the feedback information includes information regarding the amount of increase in the transmission gain.

14. The network monitoring device of claim 13, wherein the one or more processors, to determine the amount of increase in the transmission gain, are configured to:
  determine the amount of increase in the transmission gain based on a difference between a measured reference signal received power (RSRP) value and a threshold RSRP quality level.

15. The network monitoring device of claim 13, wherein the one or more processors, to determine the amount of increase in the transmission gain, are configured to:
  determine a difference between a measured reference signal received power (RSRP) value and a threshold RSRP quality level; and
  determine that the amount of increase in the transmission gain is a first gain amount or a second gain amount based on whether the difference is equal to or greater than a given difference value.

16. The network monitoring device of claim 9, wherein the one or more processors are further configured to:
  analyze communication information after the one or more network parameters are adjusted by the network station;
  determine, based on analyzing the communication information, that the network coverage being provided to the UE is inadequate after the one or more network parameters are adjusted; and
  provide updated real-time feedback information to the network station based on determining that the network coverage being provided to the UE is inadequate.

17. A network monitoring device, comprising:
  one or more memories; and
  one or more processors, coupled to the one or more memories, configured to:
    determine that a network coverage being provided to a user equipment (UE), in a location of the UE, is inadequate due to a transient blockage or a non-transient blockage obstructing coverage provided by a connected beam;
    determine, when the network coverage is inadequate due to the transient blockage, an amount of increase in a transmission gain associated with transmission on the connected beam for the network coverage to be adequate; and
    provide, to a network station, feedback information that informs the network station to adjust one or more network parameters.

18. The network monitoring device of claim 17, wherein, to determine that the network coverage being provided to the UE is inadequate due to the transient blockage or the non-transient blockage obstructing the coverage provided by the connected beam, the one or more processors are configured to:
  determine that the connected beam is experiencing the transient blockage based on one or more of:
    a blockage lasting for less than a threshold amount of time, or
    the blockage being detected on fewer than a threshold number of successive measurement reports.

19. The network monitoring device of claim 17, wherein, to determine the amount of increase in the transmission gain, the one or more processors are configured to:
  determine the amount of increase in the transmission gain based on a difference between a measured reference signal received power (RSRP) value and a threshold RSRP quality level.

20. The network monitoring device of claim 17, wherein, to determine the amount of increase in the transmission gain, the one or more processors are configured to:
  determine a difference between a measured reference signal received power (RSRP) value and a threshold RSRP quality level; and
  determine that the amount of increase in the transmission gain is a first gain amount or a second gain amount based on whether the difference is equal to or greater than a given difference value.

* * * * *